(12) United States Patent
Herrero et al.

(10) Patent No.: US 8,874,690 B2
(45) Date of Patent: *Oct. 28, 2014

(54) MOTOR VEHICLE HAVING AN INTERNET CONNECTION AND METHOD OF OPERATING SAME

(71) Applicant: Bayerische Motoren Werke, Munich (DE)

(72) Inventors: Mariano Herrero, Munich (DE); Sven Kurzeder, Munich (DE); Mikhail Smirnov, Unterfoehring (DE)

(73) Assignee: Bayerische Motoren Werke Aktiengesellschaft, Munich (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/902,030

(22) Filed: May 24, 2013

(65) Prior Publication Data

US 2013/0254338 A1  Sep. 26, 2013

Related U.S. Application Data

(63) Continuation of application No. 13/105,465, filed on May 11, 2011, now Pat. No. 8,533,287.

(30) Foreign Application Priority Data

May 12, 2010 (DE) .......................... 10 2010 028 944

(51) Int. Cl.
| | | |
|---|---|---|
| *G06F 15/16* | (2006.01) | |
| *G06F 17/30* | (2006.01) | |
| *H04W 4/04* | (2009.01) | |
| *H04L 29/08* | (2006.01) | |

(52) U.S. Cl.
CPC .......... *H04L 67/02* (2013.01); *G06F 17/30873* (2013.01); *H04W 4/04* (2013.01); *H04L 67/12* (2013.01)
USPC ............ 709/217; 709/203; 709/218; 709/219

(58) Field of Classification Search
CPC .................... G06F 17/30864; G06F 17/30873; G06F 17/30876; G06F 17/30899
USPC ................. 709/203, 217, 245, 250, 218, 219; 707/100, 713; 715/273
See application file for complete search history.

(56) References Cited

U.S. PATENT DOCUMENTS

| | | | |
|---|---|---|---|
| 6,950,882 B1* | 9/2005 | Weber et al. ................... | 709/250 |
| 7,540,051 B2* | 6/2009 | Gundersen et al. ............ | 715/273 |

(Continued)

FOREIGN PATENT DOCUMENTS

WO    WO 2007/036935 A2    4/2007

OTHER PUBLICATIONS

APPLE Inc.: iPhone Benutzerhandbuch-Fuer iPhone OS 3.1 Software. 2009.Abgerufen ueber:URL:http://www.apple.com/de/ ges. Dok, insb.S. 12- 21,80,81, pp. 1-248.

(Continued)

*Primary Examiner* — Quang N Nguyen
(74) *Attorney, Agent, or Firm* — Crowell & Moring LLP

(57) ABSTRACT

In a motor vehicle having an Internet connection and at least two computer units to which at least one operating location respectively is assigned for using the Internet, each operating location includes at least one display unit and operating devices. By each computer unit, at least one browser application for the display of Internet pages is implementable such that, by way of the input devices, Internet pages can be called at each operating location via Internet addresses and can be displayed on the display unit. An Internet address used at a first operating location, which is assigned to a first computer unit, can be automatically stored in a central address memory such that the Internet address can be made available by an access taking place from a second computer unit to the address memory at a second operating location assigned to this second computer unit. This permits a facilitated address input by the operating devices of the second operating location.

10 Claims, 1 Drawing Sheet

(56) References Cited

U.S. PATENT DOCUMENTS

| | | |
|---|---|---|
| 7,676,517 B2 * | 3/2010 | Hurst-Hiller et al. ......... 707/713 |
| 7,711,707 B2 | 5/2010 | Kelley et al. |
| 2002/0120683 A1 * | 8/2002 | Gomes et al. ................ 709/203 |
| 2003/0120727 A1 * | 6/2003 | Mentchoukov ............... 709/245 |
| 2006/0041549 A1 | 2/2006 | Gundersen et al. |
| 2009/0043789 A1 * | 2/2009 | Gupta .......................... 707/100 |
| 2009/0089293 A1 | 4/2009 | Garritano et al. |
| 2010/0138761 A1 | 6/2010 | Barnes |
| 2010/0306658 A1 | 12/2010 | Ariyoshi |
| 2011/0173589 A1 | 7/2011 | Guttman et al. |
| 2011/0282970 A1 * | 11/2011 | Herrero et al. ................ 709/217 |

OTHER PUBLICATIONS

German Search Report dated Mar. 23, 2011 with partial English translation (nine (9) pages).

* cited by examiner

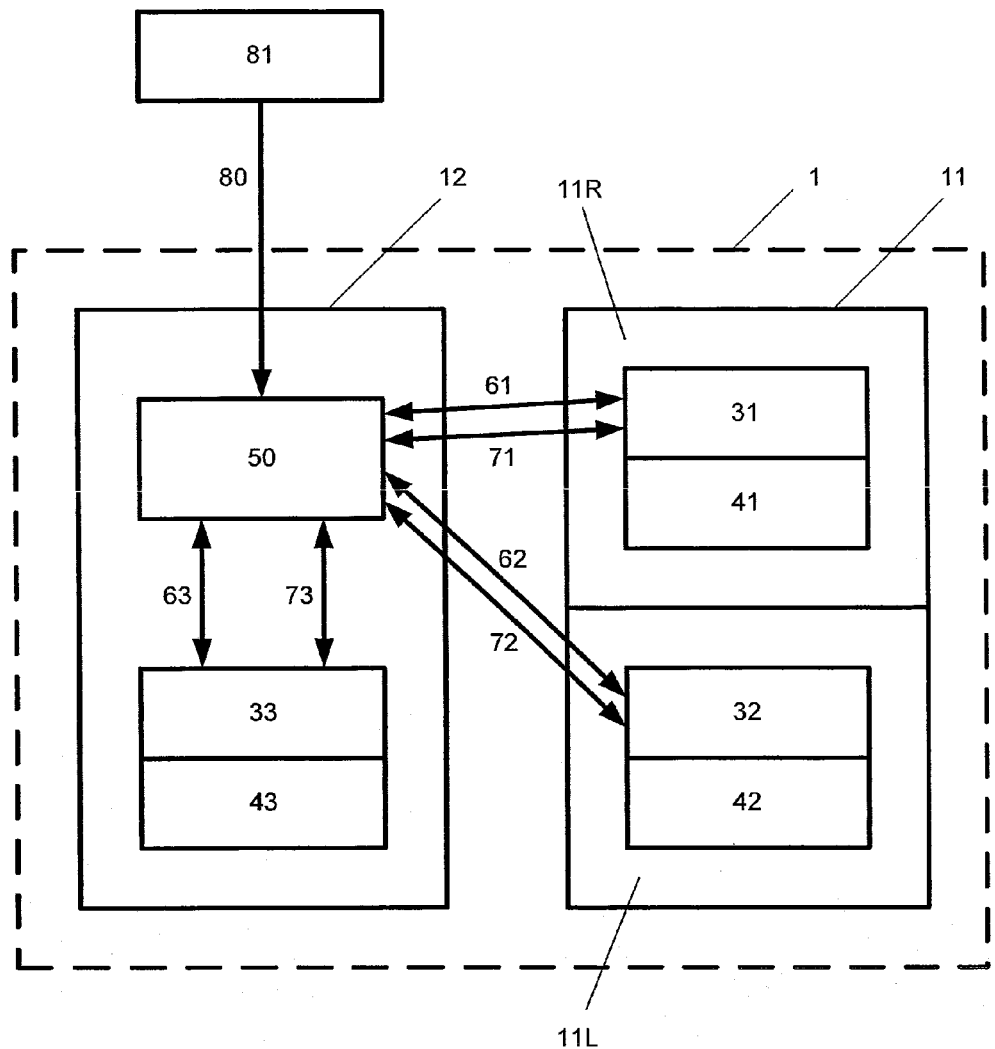

MOTOR VEHICLE HAVING AN INTERNET CONNECTION AND METHOD OF OPERATING SAME

CROSS-REFERENCE TO RELATED APPLICATION

This application is a continuation of application Ser. No. 13/105,465, filed May 11, 2011, now U.S. Pat. No. 8,533,287 which issued on Sep. 10, 2013 and which claims priority under 35 U.S.C. §119 from German Patent Application No. DE 10 2010 028 944.2, filed May 12, 2010, the entire disclosure of which is herein expressly incorporated by reference.

BACKGROUND AND SUMMARY OF THE INVENTION

The invention relates to a motor vehicle having an Internet connection and at least two computer units to which at least one operating location respectively is assigned for using the Internet, each operating location comprising at least one display unit and operating devices. By each of the at least two computer units, at least one browser application for the display of Internet pages is implementable such that, by use of the input devices, Internet pages can be called at each operating location via Internet addresses and can be displayed on the display unit.

A calling of Internet pages using Internet addresses (frequently also called URLs) typically takes place in that either the Internet address is input alphanumerically or in that a previously set so-called bookmark is called, or in that a previously used Internet address stored in a so-called browser history is selected. The selection from the Internet addresses stored in the browser history can be facilitated in that, if a desired Internet address is only partially alphanumerically entered in an operating dialog, either the desired Internet address is automatically completed by means of the browser history, or Internet addresses from the browser history preselected on the basis of the partially alphanumerical input are displayed on the display unit of the second operating location in order to select one of these Internet addresses and thereby cause an address input.

The providing of several operating locations for the display of Internet pages is known in motor vehicles, particularly for a circumstance in which, in addition to the display of Internet pages on a central information display, which may be arranged, for example, in the center of the instrument panel of the motor vehicle, a so-called rear seat entertainment system is provided by which Internet pages can also be viewed on one or even more display units in the rear of the motor vehicle.

It is an object of the present invention to increase the operating comfort when using the Internet at several operating locations in a motor vehicle.

This object is achieved by a motor vehicle having an Internet connection and at least two computer units to which at least one operating location respectively is assigned for using the Internet, each operating location including at least one display unit and operating devices. By each computer unit, at least one browser application for the display of Internet pages is implementable such that, by use of input devices, Internet pages can be called at each operating location via Internet addresses and can be displayed on the display unit. An Internet address used at a first operating location, which is assigned to a first computer unit, can be automatically stored in a central address memory such that the Internet address can be made available by an access taking place from a second computer unit to the address memory at a second operating location assigned to the second computer unit, in order to permit a facilitated address input by way of the operating devices of the second operating location.

Advantageously, an Internet address used at a first operating location, which is assigned to a first computer unit, can be automatically stored in a central address memory such that the Internet address can be made available by an access taking place from a second computer unit to the address memory at a second operating location assigned to this second computer unit, in order to permit a facilitated address input by way of the operating devices of the second operating location. In this case, the facilitated address input can be made possible particularly in that an only partially implemented alphanumerical input of the Internet address is automatically completed, and/or in that a plurality of Internet addresses stored in the address memory can be displayed on the display unit of the second operating location and an Internet address can be selected from the displayed plurality of Internet addresses by the operating devices of the second operating location in order to cause an address input.

While it is known from the state of the art to carry a so-called browser history in a respective separate manner "locally" for a single operating location or for several operating locations, a central browser history is now created for several operating locations within a motor vehicle—even if these operating locations are assigned to different computer units. Internet addresses that were used at a first operating location (for example, on the left in the rear of the motor vehicle) are available at a second operating location (for example, in the front of the motor vehicle) for the facilitated address input. As a result, different users can profit from one another, on the one hand, but, on the other hand, one and the same user, who uses different operating locations at different times for surfing the Internet, can profit from his earlier inputs.

Preferably, the storing of Internet addresses in the browser history can be implemented from any operating location without any authentication. Furthermore, preferably all Internet addresses stored in the browser history are made available at any operating location without any authentication. Both preferably take place automatically and without further prompting or operating actions by the user or users. Despite the use of different operating locations, this results in operating comfort of a single operating location even if the used operating locations are assigned to different computer units. An authentication of the user, i.e., an authorization check, particularly by way of a user name and password inquiry, will not be necessary because the vehicle itself represents a closed system where other access restrictions (vehicle locking system, alarm system, etc.) ensure that only trustworthy persons have access to the above-mentioned operating locations. Not even the storing of authorization information, particularly a user name and password, (which, as a rule, is connected with security risks that cannot be calculated) is therefore required.

According to a first advantageous embodiment of the invention, the first and the second computer unit are connected with one another by way of a bus connection, and the central address memory is arranged in a third computer unit which is connected with the first and the second computer unit also by way of a bus connection. The first and the second computer units will then "have equal access" with respect to the storage and retrieval of Internet addresses. They are also not burdened by application software, data to be stored and/or data traffic in connection with the management of the stored Internet addresses. Preferably, a third computer unit is selected which is present in the motor vehicle anyhow and is equipped with corresponding resources and/or communication possibilities.

According to a second advantageous embodiment of the invention, the first and the second computer unit are connected with one another by way of a bus connection, and the central address memory is arranged in the second computer unit. The storage and retrieval of Internet addresses can then take place from an operating location assigned to the second computer unit without causing data traffic on the data bus. This will be an advantage particularly when the operating location or locations, which is/are assigned to the second computer unit, is/are clearly used more frequently and/or more intensively than that operating location or those operating locations which is/are assigned to the first computer unit. A preferred example of an application case is that the first computer unit is constructed as a control device in a rear seat entertainment system of the motor vehicle, and that the second computer unit is constructed as a head unit of the motor vehicle. In this application case, two operating locations (one at the rear left, one at the rear right) are preferably assigned to the control device in the rear seat entertainment system, while only one operating location is assigned to the head unit, the display unit of this operating location preferably being embodied by a central information display of the motor vehicle.

In the case of the first above-mentioned embodiment of the invention as well as in the case of the second above-mentioned embodiment of the invention, the computer unit, in which the address memory is arranged, preferably executes an address management module, by which the address memory is managed. Such an address management module is preferably designed to be expandable in order to be able to centrally manage, in addition to Internet addresses, under certain circumstances, also other helpful browser data beyond operating locations and beyond computer units.

If several operating locations are assigned to a computer unit, it is particularly efficient to operate these operating locations such that a logic instance of the browser application can be implemented by the computer unit for each of the operating locations. In the above-mentioned case in which two operating locations are assigned to a control device that is part of the rear seat entertainment system of the motor vehicle, a logic instance of the browser application can therefore preferably be implemented by the control device for each of the two operating locations.

According to a particularly preferred embodiment of the invention, the above-mentioned browser application includes especially a proprietary man-system interface module and an HTML rendering module implemented particularly by open-source components, which HTML rendering module interacts exclusively with the man-system interface module. The "stripped" display functionality can therefore be provided in a cost-effective and mass-compatible manner "off the shelf" by the HTML rendering module, while an Internet address management functionality adapted to the technical realities of the equipment existing in the motor vehicle, its communication architecture and its communication protocols can be incorporated in the man-system interface module. A corresponding modular design is also advantageous for a producer-specific or even vehicle-specific design of operating surfaces. If the design of operating surfaces and the Internet address management functionality are integrated in a joint proprietary man-system interface module, the HTML rendering module can continue to be unaffected thereby, without having to create an additional module.

According to an advantageous further development of the invention, the address memory or a computer unit including the address memory has a data interface, and the motor vehicle has communication devices for the wireless communication with a stationary service device, particularly a so-called backend. Internet addresses transmitted in a wireless manner from the service device to the motor vehicle can then be entered in the address memory by way of the data interface. Furthermore, the service device can directly or indirectly provide an Internet portal or another Internet application, where—then naturally with an authorization check—Internet addresses can be comfortably input and managed from a stationary computer working station in order to then transmit them in a wireless manner into the motor vehicle. Likewise, advantageously, Internet addresses can be retrieved from the motor vehicle from such an Internet portal in order to perhaps revise and/or archive such Internet addresses.

According to an independently inventive further development of the present invention, in addition, bookmarks can be set and retrieved at each operating location—specifically such that a bookmark set at a first operating location, which is assigned to a first computer unit, can be stored in a central bookmark memory such that the bookmark can be retrieved by an access taking place by a second computer unit to the bookmark memory at a second operating location which is assigned to this second computer unit.

The bookmark memory can especially be arranged in the same computer unit as the address memory, particularly in the same memory unit of this computer unit, and can be managed by a profile management module implemented by this computer unit.

Independently of the focus on management of Internet addresses otherwise endeavored in the present application— an alternative embodiment based on very similar considerations is inventive, specifically a motor vehicle having an Internet connection and at least two computer units to which, in each case, at least one operating location for Internet use is assigned, each operating location comprising at least one display unit and operating devices. By means of each computer unit, at least one browser application for displaying Internet pages is implementable such that Internet addresses can be called at each operating location by use of input devices on the basis of Internet addresses and can be displayed on the display unit. So-called bookmarks for certain Internet addresses can be set at each operating location. The alternative concept is characterized in that a bookmark set at a first operating location, which is assigned to a first computer unit, can be stored in a central bookmark memory such that the bookmark can be retrieved by an access carried out by a second computer unit to the bookmark memory at a second operating location which is assigned to this second computer unit.

According to an alternative embodiment, the motor vehicle is preferably characterized in that the storing of bookmarks in the bookmark memory can be carried out from any operating location without authentication, i.e. without any authorization check, and that all bookmarks stored in the bookmark memory can be provided at any operating location without authentication, i.e. without any authorization check.

According to another aspect, the motor vehicle is preferably characterized, as an alternative or in addition, in that the first and second computer units are connected with one another by way of a bus connection, and in that the central bookmark memory is arranged in a third computer unit which is connected with the first and the second computer unit also by way of a bus connection.

However, according to another aspect, the motor vehicle may advantageously also be characterized in that the first and second computer units are connected with one another by way of a bus connection, and in that the central bookmark memory is arranged in the second computer unit.

According to another aspect, the motor vehicle is preferably additionally characterized in that the computer unit, in which the bookmark memory is arranged, implements a bookmark management module by which the bookmark memory is managed.

According to yet another aspect, the motor vehicle is preferably characterized, as an alternative or in addition, in that the first and second computer units are connected with one another by way of a bus connection. The first computer unit is constructed as a control device for a rear seat entertainment system of the motor vehicle. The second computer unit is constructed as a head unit of the motor vehicle.

According to still yet another aspect, the motor vehicle is preferably additionally characterized in that two operating locations are assigned to the control device for the rear seat entertainment system of the motor vehicle. A logic instance of the browser application can therefore be implemented by the control device for each of the two operating locations.

According to another aspect, the motor vehicle is preferably characterized, as an alternative or in addition, in that the browser arrangement includes, in particular, a proprietary man-machine interface module and an HTML rendering module implemented particularly by open-source components. The HTML rendering module interacts exclusively with the man-machine interface module.

According to a further aspect, the motor vehicle is preferably characterized, as an alternative or in addition, in that the bookmark memory or a computer unit including the bookmark memory has a data interface. The motor vehicle has communication devices for the wireless communication with a stationary service device, particularly a so-called backend. Bookmarks transmitted in a wireless manner from the service device to the motor vehicle can be entered into the bookmark memory by way of the data interface.

Other objects, advantages and novel features of the present invention will become apparent from the following detailed description of one or more preferred embodiments when considered in conjunction with the accompanying drawings.

BRIEF DESCRIPTION OF THE DRAWING

FIG. 1 is a schematic block diagram of an information and entertainment system in a motor vehicle having several operating locations for Internet use.

DETAILED DESCRIPTION OF THE DRAWING

FIG. 1 schematically illustrates an information and entertainment system in a motor vehicle with several operating locations for Internet use. The motor vehicle 1 has a wireless Internet connection which graphically is not shown separately in FIG. 1. Two computer units 11 and 12 of the motor vehicle meet essential functions in connection with the use of the Internet in the motor vehicle.

The computer unit 11 may function as a control device 11 that is part of a rear seat entertainment (RSE) system. Two operating locations for the Internet use are assigned to the rear seat entertainment system—one for a vehicle occupant who is on the left on a rear seat bench of the motor vehicle, another for a vehicle occupant who is on the right on the rear seat bench. Each of the two operating locations includes a display unit integrated into the backrests of the front seats and a remote control as the input device. The logical division into the two operating locations assigned to the RSE control device 11—on the left rear and the right rear—is visualized in FIG. 1 by the partition of the RSE control device 11 in two operating location halves 11L and 11R. For reasons of simplicity and brevity, operating locations 11L and 11R will also be addressed in the following.

A browser application for the display of Internet pages can be implemented by the RSE control device 11. A logic instance of the browser application can be implemented by the RSE control device 11 for each of the two operating locations 11L and 11R respectively. At each operating location 11L and 11R respectively, Internet pages can be can be called by remote control by means of Internet addresses and displayed on the display unit. In a manner known per se, the operation takes place, in particular, following the operating concept known from current vehicles manufactured by BMW.

The control device 12 is the head unit of the motor vehicle. Only a single operating location for the Internet use is assigned to the control device 12. Although this operating location can basically also be used by the front seat passenger, it is assumed that, as a rule, input is carried out by the driver. The so-called central information display (CID) of the vehicle is used as the display unit; a rotary/push control element, particularly an iDrive Controller known from current BMW vehicles, is used as the input device. In addition to carrying out numerous other communication, information and entertainment functions, the head unit 12 can also implement a browser application for displaying Internet pages. Since only a single operating location is assigned to the head unit 12, a single logic instance of the browser application will be sufficient here in order to ensure that, by means of the iDrive Controller, Internet pages can be called via Internet addresses and can be displayed on the CID. Here also, the operation takes place, in particular, following the operating concept known from current BMW vehicles.

The browser application for the head unit 12 includes a proprietary man-machine interface module 33 and an HTML rendering module 43 implemented by open-source components, which HTML rendering module 43 interacts exclusively with the man-machine interface module 33.

The logic instances of the browser application implemented by the RSE control device 11 are organized correspondingly: The instance for operating location 11L includes a man-machine interface module 32 and an HTML rendering module 42 which reacts exclusively with the man-machine interface module 32. The instance for operating location 11R includes a man-machine interface module 31 and an HTML rendering module 41 which interacts exclusively with the man-machine interface module 31.

The man-machine interface modules are capable of communicating with a profile management module (PMM) 50 implemented by the head unit. In the case of module 33, this communication takes place within the device. In the case of modules 31 and 32, this communication takes place by way of a bus connection, which is not graphically illustrated separately in FIG. 1, particularly by way of a MOST bus between the head unit 12 and the RSE control device 11. In this case, a so-called browser history, bookmarks, as well as a so-called Home URL, can be generated, changed and retrieved in the PMM 50. In FIG. 1, the corresponding information flows are visualized by double arrows 61 (between module 31 and PMM 50), 62 (between module 32 and PMM 50) and 63 (between module 33 and PMM 50).

If, for example, a certain Internet address (URL) is used at the operating location of the head unit 12, this Internet address (URL) is transmitted from the module 33 to the PMM 50 without any further action by the operator and is stored by the PMM 50 in an address memory for Internet addresses. This creates a browser history. In the present example, the address memory is not implemented as a separate memory unit but represents only a memory area of a data memory of the head unit 12. The Internet addresses stored in the address memory as browser history are subsequently available to the module 33 or to the operator interacting with the latter for the facilitated input of Internet addresses. If a URL is partially alphanumerically put in by means of the iDrive Controller, the URL can be completed more or less automatically by use of the entries of the browser history, or Internet addresses from the browser history preselected on the basis of the partially alphanumerical input are displayed on the CID in order to permit the operator to select one of the entries and thereby cause an address input. The entire browser history can also be displayed on the CID without any preceding partially alphanumerical input in order to make it possible for the operator to select one of the entries. For this purpose, the module 33 retrieves the corresponding entries from the PMM 50 in the case of a partially alphanumerical URL input or in the case of an explicit browser history call.

However, the Internet addresses stored in the address memory as browser history are also available to the modules 31 and 32 or to an operator interacting with one of these modules at one of the RSE operating locations 11L and 11R respectively for the facilitated input of Internet addresses. Thus, if, for example, a URL is partially alphanumerically put in by means of one of the remote controls of the RSE system, this URL can also be "auto-completed" by means of the entries of the browser history, or URLs preselected corresponding to the partial input from the browser history are displayed on the respective RSE display unit in order to make it possible for the operator to select one of the entries. Calling the complete browser history is also contemplated. For this purpose, the module 31 or 32 retrieves the corresponding entries from the PMM 50 in the case of a partially alphanumerical URL input or in the case of an explicit browser history call. The browser history is therefore also available at RSE operating locations 11L and 11R.

This correspondingly applies to the storing of URLs used at the RSE operating locations 11L and 11R. If a URL is used, for example, at operating location 11L, this URL will be reported to the PMM 50 by the module 32 without any further action by the operator and is added to the browser history by the PMM 50. An entry into the browser history generated in this manner from one of the RSE operating locations 11L and 11R will then equally be available also at the operating location assigned to the head unit, for a facilitated input.

As a result, any operating location or any of the modules 31, 32, 33 or any operator interacting with one of these modules has an equal right to generate browser history entries as well as equal access to the browser history. The browser history combines all URLs used at the different operating locations. If, during a first motor vehicle trip, the operator sits in the driver's seat and uses the Internet there by way of the operating location assigned to the head unit, he will be able to find the URLs called during the first trip also during a later second trip in the browser history if, during this second trip, he sits in the rear of the motor vehicle and uses the Internet by way of one of operating locations 11L or 11R. He does not have to pass an authorization check for this purpose. Since the vehicle is considered to be a closed secure system, such an authorization check, for example, by means of the user name or a password, will not be necessary.

Corresponding modules of the RSE control device 11 and of the head unit 12 are implemented largely identically. The modules 31, 32, 33 generate essentially identical operating surfaces but differ because of specific input/output functions adapted to the hardware of the respective operating location as well as because of the fact that module 33 interacts with the profile manager 50 (double arrow 63) "only" within the head unit 12, while modules 31 and 32 each interact by way of the MOST bus connection between the head unit 12 and the RSE control device 11 with the profile manager 50 (double arrows 61 and 62). The modules 41, 42, 43 are implemented identically as a so-called core browser (particularly WebKit).

In addition to the browser history, the PMM 50 also centrally manages bookmarks. Bookmarks can be set and retrieved at each of the three operating locations. Also for this purpose, the man-machine interface modules 31, 32, 33 are capable of communicating with the PMM 50. In the case of module 33, this communication takes place within the device. In the case of modules 31 and 32, this communication takes place by way of the MOST bus between the head unit 12 and the RSE control device 11. The corresponding information flows are visualized in FIG. 1 by double arrows also for this purpose: double arrow 71 for the information flow between module 31 and PMM 50, double arrow 72 for the information flow between module 32 and PMM 50, and double arrow 73 for the information flow between module 33 and PMM 50.

Independently of at which operating location a bookmark is set, it is entered in a central bookmark memory in the head unit by the PMM 50. The bookmark memory and the address memory are therefore arranged in the same computer unit, in the present case, even in the same memory unit, and they are both managed by the profile management module 50 implemented by the head unit. The bookmark memory and the address memory can jointly be considered to be a profile memory arranged in the head unit. Corresponding to the approach during the entering of URLs in the browser history, a bookmark set by the respective operator (in a manner known per se) is transmitted from the respective man-machine interface module 31, 32, 33 to the PMM 50 in order to store it in the bookmark memory. Inversely, the bookmark memory can be accessed from each operating location by way of the respective module and the PMM 50 in order to retrieve the centrally managed bookmarks.

As a result, the following also applies to the management of the bookmarks: each operating location or each of the modules 31, 32, 33 or each operator interacting with one of these modules has the equal right to generate bookmarks as well as to access the bookmarks. The bookmarks in the bookmark memory represent the combination quantity of all bookmarks generated at the different operating locations. If, during a first motor vehicle trip, the operator sits in the driver's seat and uses the Internet there by way of the operating location assigned to the head unit, he will be able to retrieve the bookmarks generated during the first trip also during a later second trip from the bookmark memory if, during this second trip, he sits in the rear of the motor vehicle and uses the Internet by way of one of the operating locations 11L or 11R. He does not have to pass an authorization check for this purpose.

In addition to the browser history and the bookmarks, the PMM 50 also centrally manages a so-called home URL (often also called starting or home page). A single home URL exists for all three operating locations in the motor vehicle. This home URL is managed by the PMM 50; it can be changed from any operating location; and it is available at any operating location. For reasons of clarity, FIG. 1 illustrates no further information flows related to the latter. The management of the home URL essentially corresponds to that of the bookmarks. Finally, the home URL represents a "special" bookmark as it were. The home URL is also stored in the already addressed profile memory.

The signal flow arrow 80 illustrates a configuration of the profile memory taking place from a so-called backend 81. The motor vehicle has communication devices for the wireless communication with the backend 81. In a manner known per se, the wireless communication between the backend and the motor vehicle takes place particularly in the form of a so-called "provisioning". Inside the motor vehicle, the PMM 50 receives prompts originating from the backend for the storage of profile data in the profile memory and carries out the corresponding storage. In this manner, bookmarks, a browser history and a home URL can be stored. In the simplest case, previously stored profile data are simply overwritten. As an alternative, a combination of the added and already existing profile data can be formed.

An Internet portal, which is not graphically illustrated separately in FIG. 1, is coupled with the backend 81. By using the Internet portal, bookmarks, history URLs and a home URL can be comfortably put in and managed from a stationary computer working location in order to subsequently transmit them in a wireless manner into the motor vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
    an Internet connection;
    first and second computer units;
    a bus operatively coupling the first and second computer units, wherein the first computer unit is operatively configured as a control device of a rear seat entertainment system of the motor vehicle from which the Internet is accessible via the Internet connection, and wherein the second computer unit is operatively configured as a head unit of the motor vehicle also from which the Internet is accessible via the Internet connection;
    each of the rear seat entertainment system and head unit including a display unit and an input device;
    wherein each of the first and second computer units is operatively configured for a browser application for retrieving Internet page bookmarks and displaying corresponding Internet pages by use of the respective input device, said bookmarks being retrievable at each of the rear seat entertainment system and head unit and corresponding Internet pages being displayable on the respective display unit; and
    a central bookmark memory making available said bookmarks at each of the rear seat entertainment system and head unit, wherein bookmarks set at the rear seat entertainment system via the first computer unit are storable in the central bookmark memory so as to be retrievable via an access taking place from the second computer unit to the central bookmark memory at the head unit.

2. The motor vehicle according to claim 1, wherein the storing of the bookmarks in the central bookmark memory occurs from any operating location without authentication, and wherein all of the stored bookmarks in the central address memory are available at any operating location without authentication.

3. The motor vehicle according to claim 1, further comprising:
    a third computer unit in which is operatively located at the central address memory, the third computer unit being coupled with the first and second computer units via another bus.

4. The motor vehicle according to claim 1, wherein the central bookmark memory is arranged in the second computer unit.

5. The motor vehicle according to claim 1, wherein:
    two operating locations are assigned to the control device for the rear seat entertainment system; and
    further wherein a logic instance of the browser application is run by the control device for each of the two operating locations.

6. The motor vehicle according to claim 1, wherein the browser application comprises a man-machine interface module and an HTML rendering module, said HTML rendering module being constructed of open-source components and interacting exclusively with the man-machine interface module.

7. The motor vehicle according to claim 1, wherein:
    the central bookmark memory is arranged in one of the first and second computer units; and
    a profile management module implemented by the one computer unit in which the central bookmark memory is arranged, the profile management module managing the central bookmark memory.

8. The motor vehicle according to claim 1, further comprising:
    a data interface of the central bookmark memory or a computer unit comprising the central bookmark memory;
    communication devices of the motor vehicle for wirelessly communicating with a stationary service device;
    wherein bookmarks wirelessly transmitted from the stationary service device to the motor vehicle are enterable in the central bookmark memory via the data interface.

9. A method of operating a motor vehicle having an Internet connection and at least first and second computer units to which a rear seat entertainment system and head unit, respectively, is assigned, each of the rear seat entertainment system and the head unit including at least one display unit and an input device, the method comprising the acts of:
    storing in a central bookmark memory an Internet page bookmark set at the rear seat entertainment system via the first computer unit, wherein the first computer unit is operatively configured as a control device of the rear seat entertainment system of the motor vehicle from which the Internet is accessible via the Internet connection; and
    retrieving said bookmark via an access that occurs from the second computer unit to the central address memory at the head unit assigned to the second computer unit,
    wherein each of the first and second computer units is operatively configured for a browser application for retrieving bookmarks and displaying corresponding Internet pages by use of the respective input device, said bookmarks being retrievable at each of the rear entertainment system and the head unit and corresponding Internet pages displayable on the respective display unit.

10. The method according to claim 9, wherein the act of storing further comprises the act of allowing the storing of the bookmark from either of the rear entertainment system and head unit without authentication.

* * * * *